United States Patent
Briggs

(10) Patent No.: US 6,493,479 B1
(45) Date of Patent: Dec. 10, 2002

(54) CROSSPOINT SWITCH PROTECTION USING ADDITIONAL SWITCHING ELEMENTS TO PROVIDE ALTERNATE PATHS

(75) Inventor: Alan Briggs, Cambridgeshire (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/545,547

(22) Filed: Apr. 7, 2000

(51) Int. Cl.[7] .............................. G02B 6/26; G02B 6/35
(52) U.S. Cl. ............................. 385/17; 385/15; 385/16; 385/18
(58) Field of Search .............................. 385/15, 16, 17, 385/18

(56) References Cited

U.S. PATENT DOCUMENTS

| | | | | |
|---|---|---|---|---|
| 5,544,268 A | * | 8/1996 | Bischel et al. | 385/16 |
| 6,049,641 A | * | 4/2000 | Deacon et al. | 385/15 |
| 6,091,867 A | * | 7/2000 | Young et al. | 385/17 |
| 6,144,781 A | * | 11/2000 | Goldstein et al. | 385/16 |
| 6,160,928 A | | 12/2000 | Schroeder | 385/18 |
| 6,198,856 B1 | * | 3/2001 | Schroeder et al. | 385/16 |
| 6,317,529 B1 | * | 11/2001 | Kashima | 359/128 |
| 6,320,995 B1 | * | 11/2001 | Schroeder | 385/17 |
| 6,334,010 B1 | * | 12/2001 | Sotom et al. | 385/17 |

FOREIGN PATENT DOCUMENTS

JP 2001-258084 * 9/2001

OTHER PUBLICATIONS

"Free—Space Micro Machined Optical Switches for Optical Networking" by Ly Lin et al, IEEE Journal of selected topics in Quantum Electronics vol. 5 No. 1 Jan./Feb. 1999.

* cited by examiner

Primary Examiner—Tulsidas Patel
Assistant Examiner—Michael C. Zarroli
(74) Attorney, Agent, or Firm—Lee, Mann, Smith, McWilliams, Sweeney & Ohlson

(57) ABSTRACT

A crosspoint switch is provided that has N inputs, M outputs, and an array of (N+X)×(M+X) switching elements, where N, M, and X are all positive integers. By providing more than the standard N×M switching elements, it becomes possible to utilise the additional switching elements to provide one or more additional protection pathways to compensate for a failure in a switching element: in the event of failure of a switching element, an affected path between one of the M inputs and M outputs can be replaced by an alternate path utilising one or more of the additional switching elements.

16 Claims, 5 Drawing Sheets

CROSSPOINT SWITCH PROTECTION USING ADDITIONAL SWITCHING ELEMENTS TO PROVIDE ALTERNATE PATHS

FIELD OF THE INVENTION

The present invention relates to a crosspoint switch, and in particular to an apparatus and a method suitable for providing alterative pathways through the switch in the event of a failure of a switching element. These alternative pathways have the potential to be engaged automatically and/or remotely.

BACKGROUND OF THE INVENTION

Communications networks are moving towards becoming all optical (photonic) networks, incorporating photonic (optical) switching in which optical signals are switched directly rather than converted to electrical signals, switched electrically, then converted back to optical signals for re-transmission. Photonic switches may be used to switch wavelength division multiplexed (WDM) signals as a group, or the WDM signals may be demultiplexed outside the switch and switched individually as channels, or as groups of channels as desired. Photonic switches are fabricated using a range of technologies and frequently employ a crosspoint (crossbar) architecture. In such architectures light from an input port may traverse a number of switching elements. At each switching element the light may be switched and directed towards an associated output port or alternatively pass though to the next switching element. Once the light has been directed towards an output port it may traverse more switching elements which, in most implementations, must remain inactive so as not to block or disrupt the light path before it reaches its output port.

For example, a recently developed photonic switch using Micro Electro-Mechanical systems (MEMS) technology is described in "Free-Space Micro Machined Optical Switches for Optical Networking" by L Y Lin et al, IEEE Journal of Selected Topics In Quantum Electronics, Vol. 5 No.1, January/February 1999; which is incorporated herein by reference. Such MEMS switches typically use moveable mirrors to redirect optical paths within the switch in order to complete an optical signal or channel connection across the switch.

FIG. 1 shows a schematic diagram of a typical MEMS photonic switch 100. The switch 100 is bi-directional, but for simplicity is assumed to comprise 4 inputs in the form of optical fibres 112, 114, 116 & 118, and 4 outputs which are also optical fibres 122, 124, 126 & 128 Each input and output has an associated lens 104 which collimates the beams from the inputs and focuses the beam at the outputs. Such a switch is generically referred to as a 4×4 switch (number of inputs×number of outputs).

The switch 100 is a crosspoint (cross bar) switch, having a switching element (here, a mirror, 106) located at each of the points at which optical signals emitted from the input fibres would cross with optical signals emitted from the output fibres. The switch 100 thus has a four by four array of mirrors 106 mounted on a surface 102.

In this particular switch, each mirror may be moved between two stable positions. FIGS. 2a and 2b illustrate these positions. FIG. 2a shows the mirror in the inactivated position 106a, where the mirror is flat i.e. substantially parallel to the surface 102. FIG. 2b shows the mirror having been raised to the activated or upright position 106b, substantially perpendicular to the surface 102. This activation may be performed by a variety of means e.g. by micro actuators causing the mirror to be rotated about the hinges 108. The mirrors are typically formed of materials such as polysilicon, the reflectivity of which is increased by providing a reflective coating 107 such as gold. In the inactivated state, it is typical for the relatively non-reflective surface 109 of the mirror to lie adjacent to the surface 102, so that the reflective coating 107 does not contact the surface 102.

FIG. 1 shows a typical operation of the switch 100. By raising the appropriate mirrors, an optical signal from each of the inputs 112, 114, 116 & 118 is directed to a respective output 128, 126, 122 & 124. For instance, an optical signal originating from input fibre 112 is formed into a collimated beam 132 by lens 104. The beam 132 then reflects off the front reflective surface 107 of a raised mirror 106b into a further lens 104 which focuses the beam 132 into the output fibre 128. it will be appreciated that by appropriate control of the array of mirrors 106, any one of the signals originating from the inputs 112, 114, 116 & 118 can be switched into any one of the outputs, 122, 124,126 & 128.

In any system switching information, it is desirable to provide alternative pathways for the information in the event that the original pathway "fails" and is unable to transmit the signals as desired. Such alternative pathway provision is commonly referred to as "protection" when these pathways may be engaged remotely and/or automatically.

it will be appreciated that a failure in any of the internal switching elements (mirrors 106) would impair the functionality of the switch. For instance, any of the mirrors could be jammed in either the raised 106b or flat 106a position, and this would prevent a connection between the input and output corresponding to that mirror. In addition a mirror which is jammed in the raised position has the potential to prevent a connection between the associated input and another output and between another input and the associated output. This is because the raised mirror may act as a block to such light paths.

The present invention aims to address such problems.

SUMMARY OF THE INVENTION

In a first aspect, the present Invention provides a crosspoint switch comprising N primary inputs, M primary outputs and an array of (N+X)×(M+X) switching elements, where M, N and X are all positive Integers, the additional switching elements in said array being arranged to provide alternative connectivity between said inputs and outputs.

A typical crosspoint switch having N inputs and M outputs will have an array of N×M switching elements. By providing the additional switching elements in the array, it becomes possible to provide alternative connectivity between the inputs and outputs to compensate for any failures in the part of the array normally utilised for switching.

Preferably, said switch is a photonic switch. Photonic switches can have switching elements such as reflective surfaces (mirrors), refractive media, or interferometers.

Preferably, said additional switching elements comprise at least one column at an outermost edge of the array, and at least one row at an outermost edge of the array.

Preferably, the additional switching element located at the intersection of each of said row and said column is located in a fixed position so as to redirect incident signals in a predetermined manner. Such a switching element can act to redirect an incident signal from said row along said column, or from said column along said row.

Alternatively the switch can further comprise X additional inputs and X additional outputs, each of said additional outputs being transmissively connected to a respective additional input.

Preferably, said switch is a photonic switch, and said additional outputs are connected to said additional inputs by an optical fibre or other form of optical wave-guide.

Optionally, at least one of said additional outputs is coupled to a tap for the monitoring of signals passing through said output.

Preferably, N=M.

Preferably, X=2. If X=2, or any even number, protection can be provided for one or more switching elements that fail in the active position and act to block signals.

Preferably, said array is substantially rectilinear.

In another aspect the present invention provides a node for a telecommunications network comprising a crosspoint switch comprising N Inputs, M outputs and an array of (N+X)×(M+X) switching elements, where M, N and X are all positive integers, the additional switching elements in said array being arranged to provide alternative connectivity between said inputs and outputs.

In another aspect the present invention provides a transmission system comprising a transmitter and a receiver, and a transmission line connecting the transmitter to the receiver, the system further comprising a crosspoint switch comprising N inputs, M outputs and an array of (N+X)×(M+X) switching elements, where M, N and X are all positive integers, the additional switching elements in said array being arranged to provide alternative connectivity between said inputs and outputs.

In a further aspect the present invention provides a method of operating a crosspoint switch comprising N inputs, M outputs and an array of (N+X)×(M+X) switching elements, where N, M and X are all positive integers, the method comprising detecting that switching element has ceased to function correctly; and providing control signals to the switching elements for configuring the switching elements to provide the same connectivity as the incorrectly functioning switching element.

Preferably, said switch is a photonic switch arranged to switch optical signals, the method further including the step of providing control signals to the switching elements for configuring the switching elements so as to ensure that no optical signals are blocked by the incorrectly functioning switching element.

In another aspect, the present invention provides a computer program arranged to perform the method of a method of operating a crosspoint switch comprising N inputs, M outputs and an array of (N+X)×(M+X) switching elements, where N, M and X are all positive integers, the method comprising detecting that switching element has ceased to function correctly; and providing control signals to the switching elements for configuring the switching elements to provide the same connectivity as the incorrectly functioning switching element.

Preferably, said computer program is stored on a machine readable medium.

BRIEF DESCRIPTION OF DRAWINGS

In order that a greater understanding of the invention can be obtained, embodiments of the invention will now be described with reference of the accompanying drawings, by way of example only and without intending to be limiting, in which.

DETAILED DESCRIPTION OF PREFERRED EMBODIMENT

Figure 1:
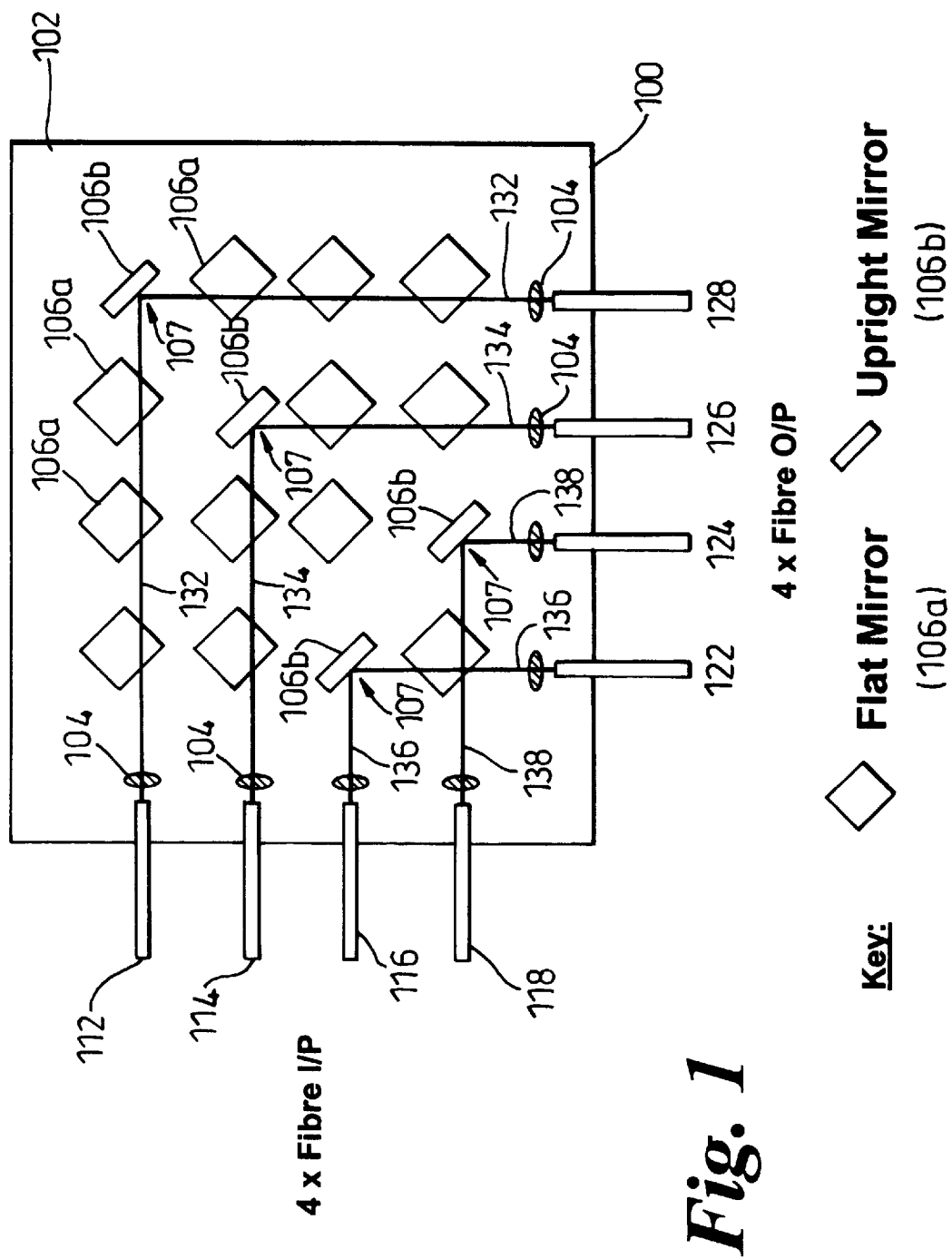
FIG. 1 shows a typical MEMO switch arrangement (PRIOR ART)
Figure 2:
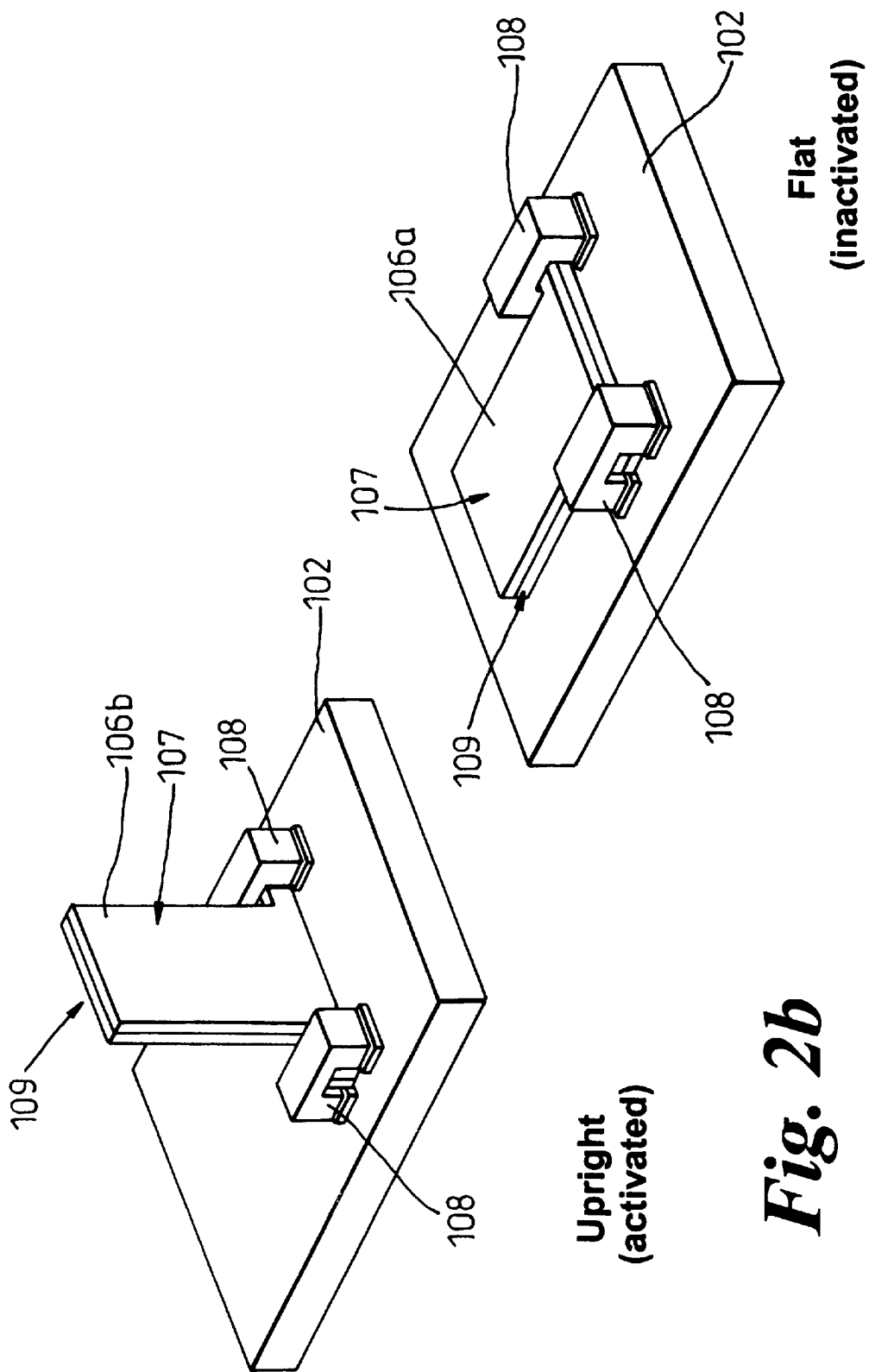
FIGS. 2a and 2b show respectively a mirror from the switch of FIG. 1 in the inactivated state and the activated state (PRIOR ART)
Figure 3:
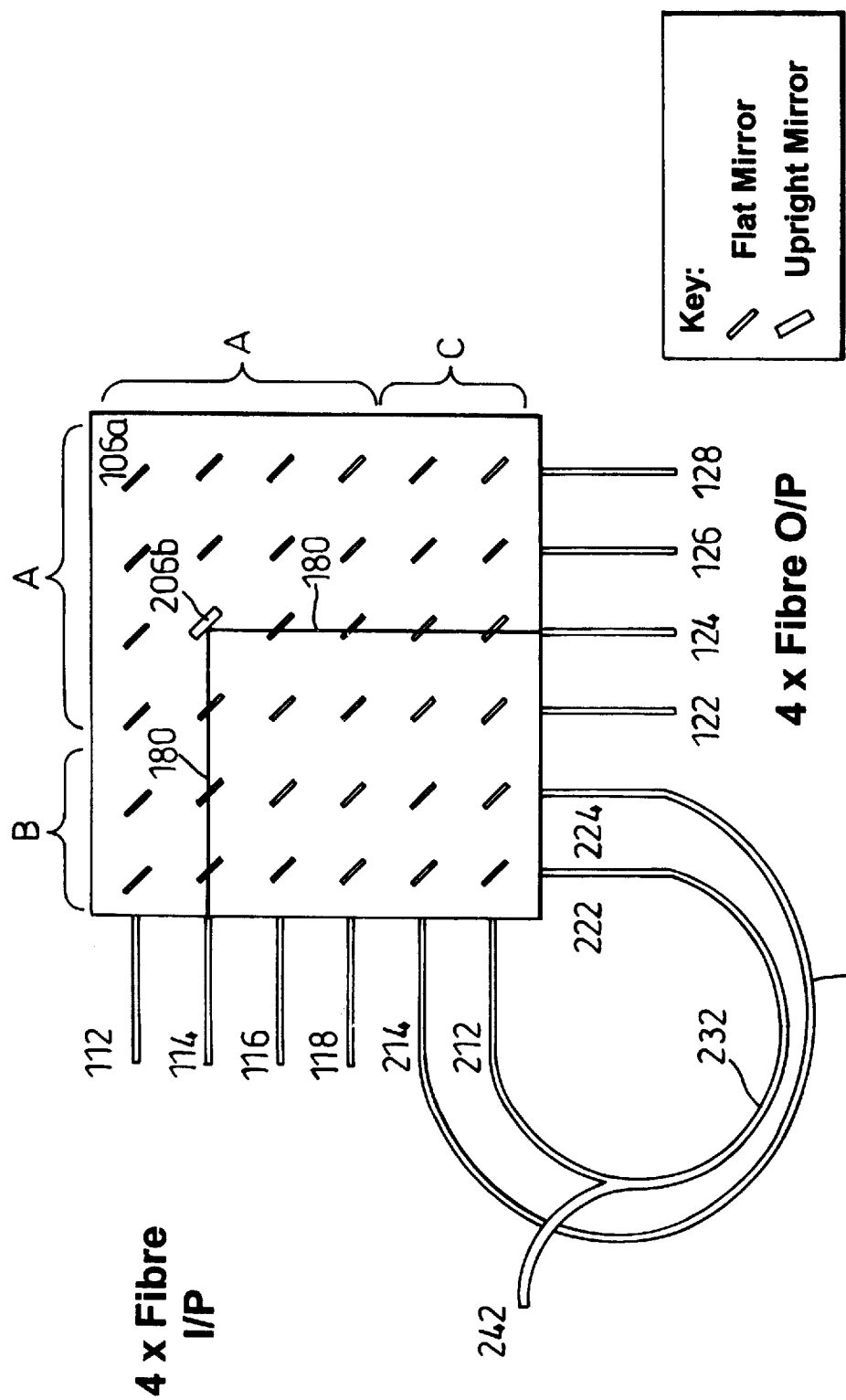
FIG. 3 shows a photonic switch according to a first embodiment of the present invention.

FIG. 3 shows a photonic switch of similar construction principles to that show in in FIG. 1, although the focusing lenses 104 have been omitted from the diagram for clarity. The switch comprises four optical wave guide inputs 112, 114,116 & 118 and four optical wave guide outputs 122, 124,126 & 128. In this instance, the wave-guide is an optical fibre.

Switching elements in the form of movable mirrors are arranged in a 6×6 array. This array can be viewed as comprising a 4×4 array (as indicated by A) with additional switching element arranged as two additional columns B adjacent to the inputs, and two additional rows C adjacent to the outputs i.e. the illustrated 4×4 crosspoint switch has an array of (4+2)×(4+2), as opposed to a normal crosspoint switch which would have an array of 4×4 switching elements.

This particular embodiment of the invention further comprises two additional outputs 222, 224 respectively coupled by optical wave-guides 232, 234, to inputs 212, 214. An optical signal entering an output 222, 224 would thus re-enter the switch via the respective input 212, 214 due to transmission along the respective wave-guide 232, 234.

Additionally, the optical wave-guide 232 has a tap 242 for allowing the monitoring of signals passing along the wave-guide 232. In this instance, both 232 and 242 consist of optical fibres, the tap comprising a splice such that part of the optical signal transmitted along the fibre 232 will be transmitted along the fibre 242. The fibre 242 may hence be connected to an optical detector to allow the monitoring of the signals passing along fibre 232.

In normal operation, the switch functions in a similar manner to the switch shown in FIG. 1. Optical signals from inputs 112, 114, 116, 118 can be respectively directed to any of the outputs 122, 124, 126 & 128 by raising the appropriate mirror into the upright position from the 4×4 array of switching elements denoted by the letters AA. For Instance, the optical signal 180 from input 114 is switched to output 124 by the mirror 206b being in the upright position.

Figure 4:
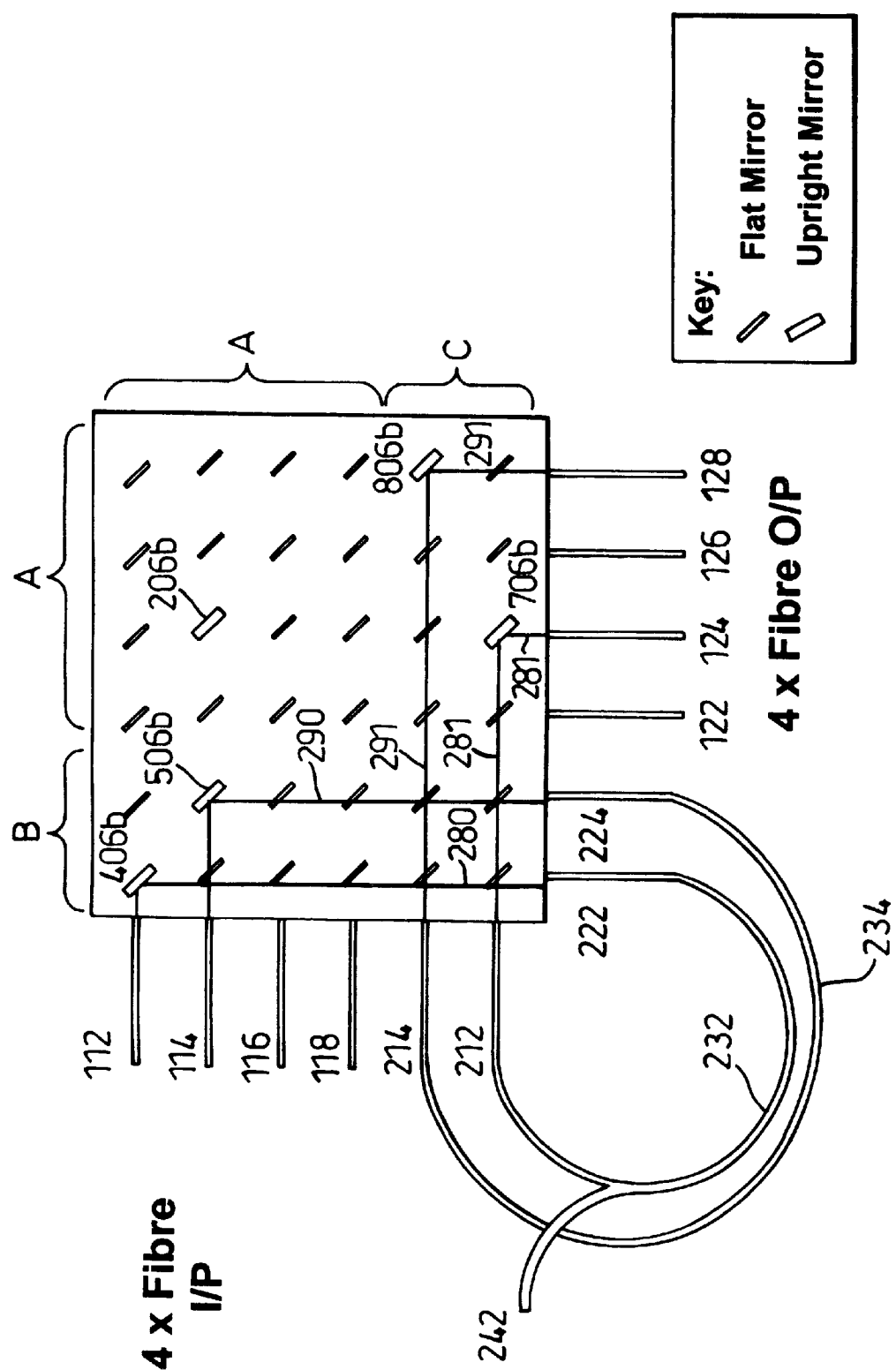
FIG. 4 shows an alternative configuration of the switch of FIG. 3.

FIG. 4 shows the same switch as in FIG. 3, but where the mirror 206b has been jammed in the upright position. it is desired to switch the optical signal from input 114 to the output 128. However, it will be appreciated that the malfunctioning mirror 206b would prevent this switch occurring by using the AA switching elements. Consequently, the signal 290 from input 114 is re-directed by additional switching mirror 506b to output 224 and hence via fibre 234 to input 214 where the signal emerges and is denoted by 291, The signal 291 is then re-directed by the additional switching element 806b to the desired output 128. Consequently the input 114 is connected to the output 128 by the additional switching elements provided in columns B and rows C i.e.

by using the alternative protection pathways provided by these additional rows and columns.

In this particular instance, it is also desirable to connect input 112 to output 124. As mirror 206b is jammed in the upright position, the corresponding crosspoint element in the array AA cannot be utilised to switch the optical signal from input 112. Consequently, mirror 406b is actuated to be in the upright position so as to redirect the input signal 280 from input 112 into the additional output 222. The signal is then transmitted along the wave guide 232 to additional input 212, where the emerging signal 281 is then switched by raised mirror 706b into the desired output 124. Hence the desire to connectivity between input and output is once again achieved by using the alternative protection rows and columns.

This invention thus utilises two additional rows and two additional columns in order to provide alterative protection pathways in the switch for a single switching element failure. Two such rows and columns are necessary as the switching element had failed in the on (upright) position, and so incident signals on the switching element would be spuriously redirected. However, if the switching element was to fail in the off position (with the mirror flat) then the switching element would not spuriously redirect signals, and hence one additional row and one additional column would be required to provide protection. Thus, in systems where a switching element failure would not block signals, only one additional row and column would be required to provide protection.

For instance, if mirror 206b had failed in the flat position then any of the inputs 112, 114, 116 & 118 could be connected to any of the outputs 122, 124, 126, 128 by the 4×4 array of mirrors AA. The only exception to this would be input 114 could not be connected to output 124 due to the failure of switching element 206b. However, only a single additional row and additional column would be required to re-route this signal if such connectivity was desired.

Figure 5:
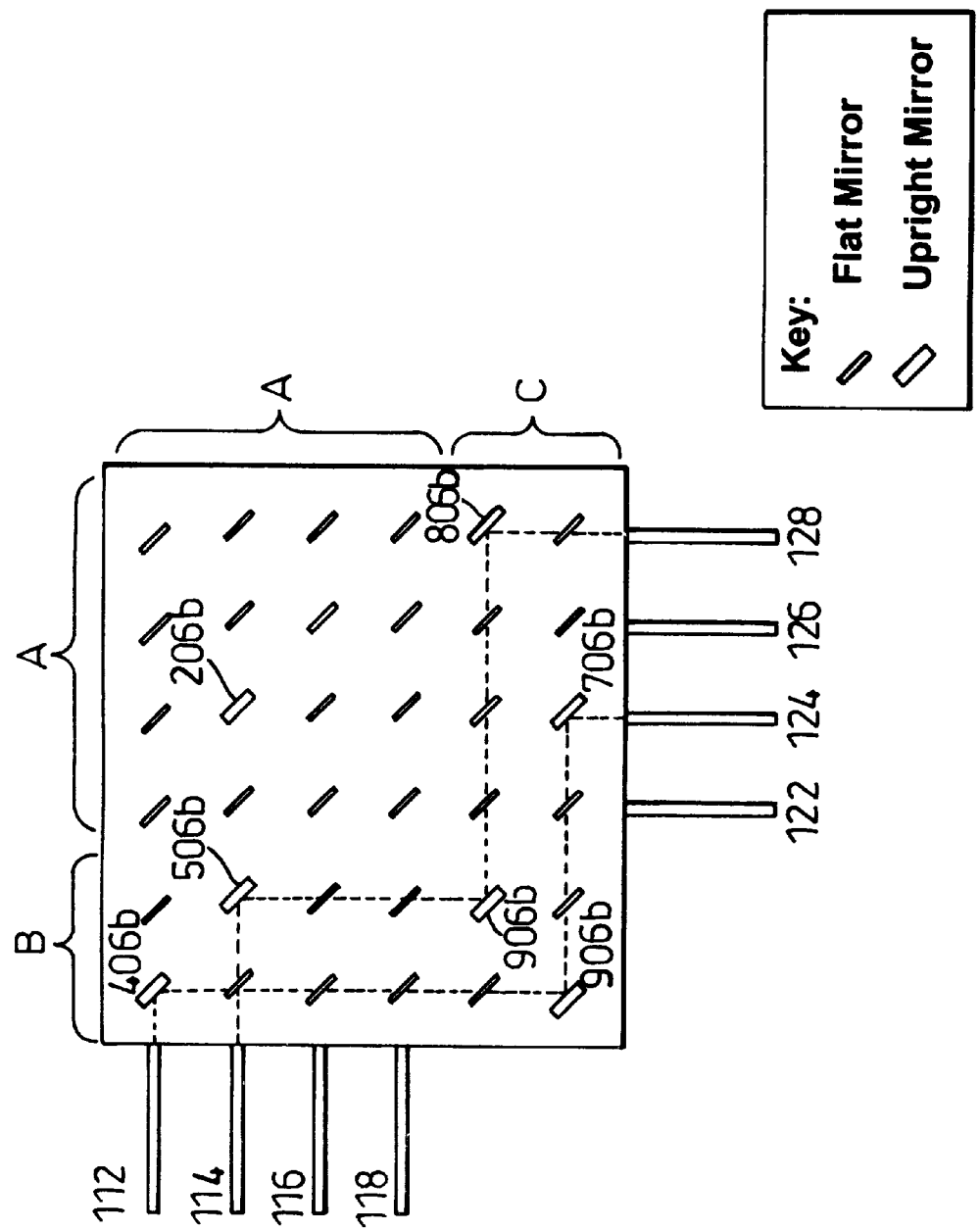
FIG. 5 shows a photonic switch according to a second embodiment of the present invention.

FIG. 5 shows an alternative embodiment of the present invention. This embodiment corresponds generally to the embodiment shown in FIGS. 3 and 4, with the amendments that no additional inputs 212, 214, outputs 222, 224 or connecting means 232, 234 are present, and instead this functionality has been replaced by mirrors 906b. The mirrors 906b are located along the diagonal of the 6×6 array of switching elements where the additional columns B and additional rows C intersect. Such switching elements 906b are arranged to direct signals from a respective one of the columns B along a respective one of the columns C. In the figures as illustrated, a normal mirror (e.g. 106b) produces a 90° clockwise rotation of the optical signal in respect of the direction of beam propagation. Switching elements 906b have rear reflective surfaces, and hence produce a 90° anticlockwise rotation of the optical signal. In this instance, the switching elements are fixed in the upright position in order to achieve greater reliability (by ensuring that they do not become lammed in the flat position).

In FIG. 5, it is once again assumed that mirror 206b has become jammed in an upright position, and that connectivity is desired between input 112 and output 124, and input 114 and output 128.

This connectivity is achieved by the signal from input 122 being reflected off mirror 406b, then subsequently reflected off the static mirror 906b to mirror 706b and hence into output 124. Equally, a signal from mirror 114 is reflected off mirror 506b to the corresponding mirror 906b and hence to mirror 806b and to input 128. it will thus be appreciated that the switching elements 906b achieve the same functionality as the additional inputs and outputs 222, 224, 214, 212. Equally, whilst both the switching elements 906b have been indicated as lying along the diagonal of the 6×6 array of switching elements, it will be appreciated that such switching elements 906b could equally be located at any appropriate intersection of an additional column B and an additional row C.

Whilst both embodiments of the present invention have indicated that two additional rows and columns of additional switching elements can be utilised, it will be appreciated that any number of additional rows and columns of additional switching elements could be used to provide alternative protection pathways in a crosspoint switch.

By providing such additional switching elements, the failure of a single one of the normal switching elements of a crosspoint switch can be routed around. This would maintain full switch functionality in the event of a failure of a single (or, if sufficient protection pathways are provided, a plurality) of switching elements within the switch.

Whilst the present invention has been described in conjunction with a photonic switch, it will be appreciated that equally the invention could be applied to any switch utilising a crosspoint architecture e.g. an electrical switch.

For the purpose of this specification, the terms "optical" and "light" should be understood as pertaining not only to the visible part of the electro magnetic spectrum, but also to the infra-red and ultra-violet parts that bound the visible part.

Any range or device given herein maybe extended or altered without losing the effect sort, as will be apparent to a skilled person from an understanding of the teaching herein.

What is claimed is:

1. A crosspoint switch comprising N inputs, M outputs and an array of (N+X)×(M+X) switching elements, where M, N and X are all positive integers and X is greater than 1, the additional switching elements in said array being arranged to provide alternative connectivity between any of said N inputs and any of said M outputs whereby in the event of failure of a switching element, in any one of an "on" position and an "off" position, connectivity between each of said inputs and each of said outputs is maintained.

2. A crosspoint switch as claimed in claim 1, wherein said switch is a photonic switch.

3. A switch as claimed in claim 1, wherein said additional switching elements comprise at least one column at an outermost edge of the array, and at least one row at an outermost edge of the array.

4. A switch as claimed in claim 3, wherein the additional switching element located at an intersection of said row and said column is located in a fixed position so as to redirect incident signals in a predetermined manner.

5. A switch as claimed in claim 1, further comprising X additional inputs and X additional outputs, each of said additional outputs being transmissively connected to a respective additional input.

6. A switch as claimed in claim 5, wherein said switch is a photonic switch, and said additional outputs are connected to said additional inputs by an optical wave guide.

7. A switch as claimed in claim 5, wherein at least one of said additional outputs is coupled to a tap for the monitoring of signals passing through said output.

8. A switch as claimed in claim 1, wherein N=M.

9. A switch as claimed in claim 1, wherein X=2.

10. A switch as claimed in claim 1, wherein said array is substantially rectilinear.

11. A node for a telecommunications network comprising a crosspoint switch comprising N inputs, M outputs and an array of (N+X)×(M+X) switching elements, where M, N and X are all positive integers and X is greater than 1, the additional switching elements in said array being arranged to provide alternative connectivity between any of said N inputs and any of said M outputs whereby in the event of failure of a switching element in any one of an "on" position and an "off" position, connectivity between each of said inputs and each of said outputs is maintained.

12. A transmission system comprising a transmitter and a receiver, and a transmission line connecting the transmitter to the receiver, the system further comprising a crosspoint switch comprising N inputs, M outputs and an array of (N+X)×(M+X) switching elements, where M, N and X are all positive integers and X is greater than 1, the additional switching elements in said array being arranged to provide alternative connectivity between any of said N inputs and any of said M outputs whereby in the event of failure of a switching element in any one of an "on" position and an "off" position, connectivity between each of said inputs and each of said outputs is maintained.

13. A method of operating a crosspoint switch comprising N inputs, M outputs and an array of (N+X)×(M+X) switching elements, where N, M and X are all positive integers and X is greater than 1, the additional switching elements in said array being arranged to provide alternative connectivity between any of said N inputs and any of said M outputs whereby in the event of failure of a switching element, in any one of an "on" position and an "off" position, connectivity between each of said inputs and each of said outputs is maintained, the method comprising detecting that a switching element has ceased to function correctly; and providing control signals to the switching elements for configuring the switching elements to provide the same connectivity as the incorrectly functioning switching element.

14. A method as claimed in claim 13, wherein said switch is a photonic switch arranged to switch optical signals, the method further including the step of providing control signals to the switching elements for configuring the switching elements so as to ensure that no optical signals are bleed by the incorrectly functioning switching element.

15. A computer program arranged to perform the method of operating a crosspoint switch comprising N inputs, M outputs and an array of (N+X)×(M+X) switching elements, where N, M and X are all positive integers and X is greater than 1, the additional switching elements in said array being arranged to provide alternative connectivity between any of said N inputs and any of said M outputs whereby in the event of failure of a switching element, in any one of an "on" position and an "off" position, connectivity between each of said inputs and each of said outputs is maintained, the method comprising:

detecting that a switching element has ceased to function correctly; and providing control signals to the switching elements for configuring the switching elements to provide the same connectivity as the incorrectly functioning switching element.

16. A computer program as claimed in claim 15, wherein said computer program is stored on a machine readable medium.

* * * * *